US005528292A

United States Patent [19]

Ikeda

[11] Patent Number: 5,528,292
[45] Date of Patent: Jun. 18, 1996

[54] ELECTRIC STILL CAMERA HAVING A PLURALITY OF IMAGE PICKUP ELEMENTS WITH COLOR FILTERS

[75] Inventor: Keiichi Ikeda, Kawasaki, Japan

[73] Assignee: Canon Kabushiki Kaisha, Tokyo, Japan

[21] Appl. No.: 359,848

[22] Filed: Dec. 20, 1994

Related U.S. Application Data

[63] Continuation of Ser. No. 270,797, Jul. 5, 1994, abandoned, which is a continuation of Ser. No. 848,177, Mar. 10, 1992, abandoned.

[30] Foreign Application Priority Data

Mar. 13, 1991 [JP] Japan ................... 3-047847

[51] Int. Cl.⁶ ......................................... H04N 9/04
[52] U.S. Cl. .................... 348/222; 348/273; 348/239; 348/616; 348/619; 358/909.1
[58] Field of Search ........................... 348/222, 273, 348/272, 395, 403, 607, 616, 619, 240, 239, 231, 233; 358/41–44, 133, 909, 136, 335, 310, 909.1, 906; H04N 9/04, 11/04

[56] References Cited

U.S. PATENT DOCUMENTS

| 4,721,999 | 1/1988 | Takemura | 358/44 |
|---|---|---|---|
| 4,740,833 | 4/1988 | Shiota | 358/909 |
| 4,758,883 | 7/1988 | Kawahara et al. | 358/44 |
| 4,802,001 | 1/1989 | Tabei | 358/44 |
| 4,816,914 | 3/1989 | Ericsson | 348/405 |
| 4,821,088 | 4/1989 | Tabei | 358/44 |
| 4,922,334 | 5/1990 | Hashimoto | 358/44 |
| 4,974,078 | 11/1990 | Tsai | 358/133 |
| 4,982,290 | 1/1991 | Nishi | 358/310 |
| 5,016,107 | 5/1991 | Sasson | 358/209 |
| 5,032,927 | 7/1991 | Watanabe | 358/335 |
| 5,065,229 | 11/1991 | Tsai | 358/133 |
| 5,065,246 | 11/1991 | Takemoto | 358/227 |

FOREIGN PATENT DOCUMENTS

| 0368614 | 5/1990 | European Pat. Off. |
| 0368354 | 5/1990 | European Pat. Off. |
| 1-154696 | 6/1989 | Japan. |
| WO86/01965 | 3/1986 | WIPO. |
| WO91/01613 | 2/1991 | WIPO. |

*Primary Examiner*—Safet Metjahic
*Assistant Examiner*—Sherrie Hsia
*Attorney, Agent, or Firm*—Fitzpatrick, Cella, Harper & Scinto

[57] ABSTRACT

An electronic still camera includes a plurality of image pickup elements having color filters of a plurality of colors; a color separation unit for separating outputs from the image pickup elements into each color signal; an interpolation unit for receiving an output from the color separation unit and interpolating missing part of each color image data; an orthogonal transformation unit for dividing respective color image data interpolated by the interpolation unit into a plurality of blocks and performing orthogonal transformation, a coding unit for coding an output from the orthogonal transformation unit; and a storage unit for storing an output from the coding unit.

15 Claims, 3 Drawing Sheets

ELECTRIC STILL CAMERA HAVING A PLURALITY OF IMAGE PICKUP ELEMENTS WITH COLOR FILTERS

This application is a continuation of prior application Ser. No. 08/270,797 filed on Jul. 5, 1994, which is a continuation of Ser. No. 07/848,177 filed on Mar. 10, 1992, both now abandoned.

BACKGROUND OF THE INVENTION

1. Field of the Invention

The present invention relates to an electronic still camera having image pickup elements with a plurality of color filters, and more particularly, to orthogonal transformation and coding used for image processing.

2. Related Background Art

An electronic still camera (also called a still video camera) stores image signals taken by solid state image pickup elements such as CCDs, in a storage unit such as a memory card. It is necessary to compress the image signal data to a suitable capacity, in view of a relative small capacity of the storage unit and a large amount of information pertaining to the images. As a method of data compressing, an orthogonal transformation and coding method is known. With this method, image data is divided into a plurality of blocks, and each pixel in a divided block is subject to orthogonal transformation and coding. The characteristic feature of this method is as follows. Namely, while considering the visual characteristic of human eyes, a larger number of bits are assigned to low frequency components of an image signal to finely quantize it, and a smaller number of bits are assigned to high frequency components of the image signal to coarsely quantize it. In this manner, redundant information within a block is suppressed to reduce the data amount of an image signal, without deteriorating the quality of an image.

As a method of improving compression coding factor in accordance with the layout of color filters mounted on an image pickup device, Japanese Patent Laid-open Publication No. 1-154696 discloses that color image data from color filters is subject to orthogonal transformation for each color.

The conventional method disclosed in the above-cited publication has the following disadvantages. In the case of the layout of color filters such as shown in FIG. 1, the phases (spatial positions) of pixels of R (red), G (green), and B (blue) are the same in the vertical and horizontal directions as shown in FIG. 2A to 2C, so that compression factor can be improved without deteriorating the image quality. However, in the case of the layout of color filters such as shown in FIG. 3, called a Bayer matrix, the phases of respective colors R, G, and B become as shown in FIGS. 4A to 4C. For orthogonal transformation for each color, particularly for G color, pixels with a shifted phase in each line as shown in FIG. 4A are subject to orthogonal transformation, resulting in less correlation between lines and hence deterioration of image quality and lowering of compression factor.

SUMMARY OF THE INVENTION

The present invention has been made in consideration of the above circumstances. It is an object of the present invention to provide an electronic still camera without deterioration of image quality and lowering of compression factor which might be caused otherwise by the above-described reasons.

In order to achieve the above object, an embodiment of an electronic still camera of the present invention is constructed as having:

(1) a plurality of image pickup elements having color filters of a plurality of colors; color separation means for separating the outputs from said image pickup elements into each color signal; interpolation means for receiving an output from said color separation means and interpolating missing part of each color image data; orthogonal transformation means for dividing respective color image data interpolated by said interpolation means into a plurality of blocks and performing orthogonal transformation; coding means for coding an output from said orthogonal transformation means; and storage means for storing an output from said coding means, and as having (2) said interpolation means interpolating missing part of said image data for only one color of said plurality of colors.

According to the embodiment constructed as in (1) and (2) above, outputs from the image pickup elements are separated for each color signal, a missing part of the image data is interpolated, and interpolated color image data is subject to orthogonal transformation and coding to be stored thereafter.

BRIEF DESCRIPTION OF THE DRAWINGS

FIG. 1 shows an example of a layout of color filters;

FIGS. 2A to 2C illustrate the phases of color filters shown in FIG. 1;

FIG. 3 shows an example of a layout of color filters;

FIGS. 4A to 4C show image data for each of the color filters shown in FIG. 3;

FIGS. 6A to 6C illustrate interpolation operations of the embodiment.

DETAILED DESCRIPTION OF THE PREFERRED EMBODIMENT

Figure 5:
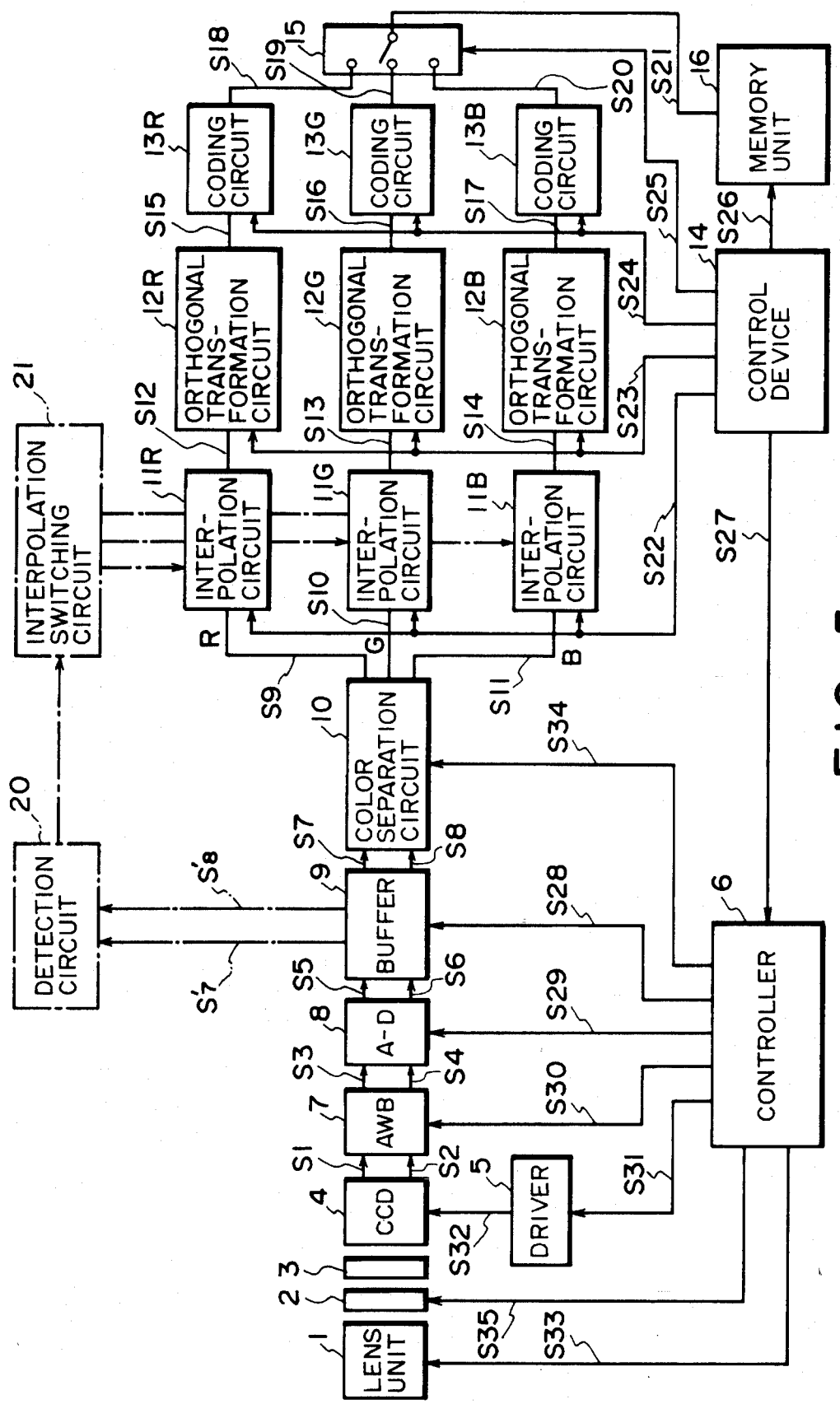
FIG. 5 is a block diagram showing an embodiment of an electronic still camera according to the present invention.

The present invention will be described in detail in connection with a preferred embodiment.

FIG. 5 is a block diagram showing an embodiment of an electronic still camera according to the present invention. In FIG. 5, reference numeral 1 represents a lens unit which has a function of adjusting a focal point and an aperture in response to a control signal S33 from a controller 6. Reference numeral 2 represents a shutter which operates in response to a control signal S35 from the controller 6. Reference numeral 3 represents color filters disposed as shown in FIG. 3. Reference numeral 4 represents a CCD. An image signal obtained by the CCD 4 is sent via signal lines S1 and S2 of a two-line read system to an automatic white balance circuit 7, under control of a control signal S32 from a driver circuit 5. White balance adjustment is performed in accordance with a control signal S30 from the controller 6. Outputs from the automatic white balance circuit 7 are sent via signal lines S3 and S4 to an A/D (analog/digital) converter 8, and converted into digital signals under control of a control signal S29 from the controller 6. The digital signals are temporarily stored via signal lines S5 and S6 into a buffer 9 under control of a control signal S28 from the controller 6. The capacity of the buffer 9 allows storing one screen or several lines thereof.

Image data stored in the buffer 9 is sent via signal lines S7 and S8 to a color separation circuit 10 which separates color signals from the color filters 3 into respective color components shown in FIGS. 4A to 4C. Separated R color signal components are sent via a signal line S9 to an interpolation circuit 11R, separated G color signal components are sent via a signal line S10 to an interpolation circuit 11G, and separated B color signal components are sent via a signal line S11 to an interpolation circuit 11B. For a missing part of image data in the vertical and horizontal directions caused by the layout of color filters 3, interpolation processes are carried out in response to a control signal S22 from a control device 14, in the manner shown in FIGS. 2A to 2C. In the case of the layout of color filters 3 shown in FIG. 3, the phases are shifted only for the G components between lines as shown in FIG. 4A, so that the interpolation process only for G is carried out.

Pixels with a symbol (') in FIGS. 6A to 6C are formed by the interpolation process. As an interpolation process, for example, an average value of adjacent four pixels for G components is used. Specifically, in FIG. 6A, $G_{12}'$ can be obtained by:

$$G_{12}'=(G_{02}+G_{11}+G_{22}+G_{13})/4.$$

A case occurs wherein each component for R and B is not contained within one line in the horizontal direction. If the component is contained in one line, an average interpolation in the horizontal direction for example may be carried out. If the component is not contained in one line, a pre-interpolation in the vertical direction may be carried out.

Outputs from the interpolation circuits 11R, 11G, and 11B are supplied via signal lines S12, S13, and S14 to orthogonal transformation circuits 12R, 12G, and 12B, in unit of blocks. The outputs are then subject to orthogonal transformation in response to a control signal S23 from the control device 14. Known as orthogonal transformation processes are Hadamard's transformation, discrete cosine transformation, discrete Fourier transformation, and the like. Values after transformation indicate the distribution of frequency components within each block. Data after orthogonal transformation is sent via signal lines S15, S16, and S17 to coding circuits 13R, 13G, and 13B, and coded while considering the visual characteristics of human eyes and weighting differently between low and high frequency components within each block. In general coding, pixels within each block are scanned and read in a zig-zag fashion, and redundancy is removed using Huffman coding or the like. A series of coding is carried out in response to a control signal S24 from the control device 14. Coded outputs from the coding circuits 13R, 13G, and 13B are inputted to a selector 15 via signal lines S18, S19, and S20. The selector 15 selects one of the inputs on the signal lines S18, S19, and S20, and outputs it onto a signal line S21, in response to a control signal S25 from the control device 14. This signal is stored in a memory device such as a memory card at a memory unit 16. Generally, outputs from the coding circuits 13R, 13G, and 13B are switched in response to a control signal S25 from the control device 14, and they are stored in the order of R, G, and B for each block.

The controller 6 is controlled by a control signal S27 from the control device 14 which controls the whole system of the electronic still camera of this embodiment. The controller 6 controls mainly the components at front circuit stages of the camera.

As described above, this embodiment carries out dividing into blocks, orthogonal transformation, and coding, after performing interpolation processes of missing part of image data. Therefore, high correlation between adjacent image data is possible, improving a compression factor of image data without deteriorating the image quality.

In the above embodiment, interpolation has been definitely determined for each of the interpolation circuits 11R, 11G, and 11B. Other interpolation processes may be performed. For example, as shown by one-dot-chain lines in FIG. 5, a detection circuit 20 and interpolation switching circuit 21 may be provided. The detection circuit 20 detects the nature of a subject in accordance with output signals from the buffer 9, i.e., detects whether graphics images are present in the horizontal or vertical direction, or whether graphics images are not present in both the directions. In accordance with the detection result, the interpolation switching circuit 21 changes the interpolation method to be used by the interpolation circuits.

Specifically, the interpolation switching circuit 21 causes the interpolation circuits to perform an average interpolation in the horizontal direction as G components interpolation in the case of graphics images of a subject present in the horizontal direction, an average interpolation in the vertical direction in the case of graphics images of a subject present in the vertical direction, and an average interpolation of adjacent four pixels in the case of no distinct graphics images present both in the horizontal and vertical directions. Alternatively, weighting of adjacent four pixel data may be set in accordance with such a nature of a subject.

What is claimed is:

1. An electronic still camera comprising:

a plurality of image pickup elements having color filters of a plurality of colors, said color filters including filter portions whose positions in the horizontal direction are different from each other for every horizontal line;

color separation means for separating outputs from said image pickup elements into each color signal;

interpolation means for correcting the difference between the positions of the filter portions by interpolating an output signal of said separation means using a predetermined interpolation method, said interpolation means comprising interpolation changing means for changing the predetermined interpolation method; and orthogonal transformation means for dividing respective color image data interpolated by said interpolation means into a plurality of blocks and performing orthogonal transformation.

2. An electronic still camera according to claim 1, wherein said interpolation means interpolates missing part of the image data for only one color of said plurality of colors.

3. An electronic still camera according to claim 1, wherein said orthogonal transformation means comprises discrete cosine transformation.

4. An electronic still camera according to claim 1, further comprising storage means for storing a coded output of said orthogonal transformation means.

5. An electronic still camera according to claim 4, wherein said storage means comprises a memory card as a storage medium.

6. An image pickup device comprising:

(a) image pickup means for converting light incident to pixels via a color filter into an electrical signal, said color filter including filter portions for passing different colors for every pixel, whose positions in the horizontal line are different from each other for every horizontal line;

(b) interpolation means for correcting the difference between the positions of said filter portions by interpolating the electrical signal converted from the light incident through said filter portions by said image pickup means using a predetermined interpolation method, said interpolation means comprising interpolation changing means for changing the predetermined interpolation method; and (c) orthogonal transformation means for performing orthogonal transformation of the interpolated electrical signal by dividing said signal into a plurality of blocks.

7. An image pickup device according to claim 6, wherein said different colors of said color filter are disposed in a Bayer matrix.

8. An image pickup device according to claim 6, wherein said orthogonal transformation means comprises discrete cosine transformation.

9. An image pickup device according to claim 6, wherein said interpolation changing means comprises interpolation switching means for switching the predetermined interpolation method to be used by said interpolation means.

10. An image pickup device according to claim 6, further comprising storage means for storing coded output of said orthogonal transformation means.

11. An image pickup device according to claim 10, wherein said storage means comprises a memory card as a storage medium.

12. An apparatus comprising:

(a) input means for inputting an image signal, said input means inputting respective components of said image signal in a predetermined order;

(b) interpolation means for interpolating the image signal by a predetermined interpolation method, the predetermined interpolation method being changeable;

(c) means for designating the predetermined interpolation method according to the predetermined order; and (d) orthogonal transform means for orthogonally transforming an output signal of said interpolation means.

13. An apparatus according to claim 12, wherein said orthogonal transform means comprises a discrete cosine transform circuit.

14. An apparatus according to claim 12, wherein said input means comprises a CCD and a color filter provided in front of said CCD, and an arrangement of the color filter corresponds to the predetermined order.

15. An apparatus according to claim 12, wherein said designating means automatically designates the predetermined interpolation method according to the image signal.

\* \* \* \* \*

UNITED STATES PATENT AND TRADEMARK OFFICE
CERTIFICATE OF CORRECTION

PATENT NO. : 5,528,292
DATED : June 18, 1996
INVENTOR(S) : KEIICHI IKEDA

It is certified that error appears in the above-indentified patent and that said Letters Patent is hereby corrected as shown below:

On The Title Page, Item [54]:
    Line 1, "ELECTRIC" should read --ELECTRONIC--.

<u>Column 1</u>
    Line 1, "ELECTRIC" should read --ELECTRONIC--.

Signed and Sealed this

Eighth Day of October, 1996

Attest:

BRUCE LEHMAN

Attesting Officer     Commissioner of Patents and Trademarks